US008460773B2

(12) United States Patent
Gluck

(10) Patent No.: US 8,460,773 B2

(45) Date of Patent: Jun. 11, 2013

(54) DETACHABLE SHEET

(75) Inventor: David Gluck, Tel Aviv (IL)

(73) Assignee: Web To Print For You, Ltd., Modiin (IL)

( * ) Notice: Subject to any disclaimer, the term of this patent is extended or adjusted under 35 U.S.C. 154(b) by 0 days.

(21) Appl. No.: 13/541,041

(22) Filed: Jul. 3, 2012

(65) Prior Publication Data

US 2012/0270004 A1 Oct. 25, 2012

Related U.S. Application Data

(63) Continuation-in-part of application No. 12/093,736, filed as application No. PCT/IL2006/001274 on Nov. 2, 2006, now abandoned.

(60) Provisional application No. 60/736,333, filed on Nov. 15, 2005.

(51) Int. Cl.
*B32B 3/30* (2006.01)

(52) U.S. Cl.
USPC .......................................... 428/43; 428/167

(58) Field of Classification Search
USPC .......................................... 428/43, 156, 167
See application file for complete search history.

(56) References Cited

U.S. PATENT DOCUMENTS

| | | | |
|---|---|---|---|
| 310,508 | A | 6/1885 | Guss |
| 2,681,732 | A | 6/1954 | Brady |
| 3,032,463 | A | 5/1962 | Morgan |
| 3,185,578 | A | 5/1965 | Scharre |
| 4,447,481 | A | 5/1984 | Holmberg |
| 4,590,109 | A | 5/1986 | Holmberg |
| 5,114,774 | A | 5/1992 | Maxim |
| 5,198,275 | A | 3/1993 | Klein |
| 5,824,379 | A | 10/1998 | Riley |
| 5,993,928 | A | 11/1999 | Popat |
| 6,099,189 | A | 8/2000 | Owen |
| 6,146,731 | A | 11/2000 | Tanoto |
| 7,175,731 | B2 | 2/2007 | Hansen |
| 2004/0134320 | A1 | 7/2004 | Hansen |

FOREIGN PATENT DOCUMENTS

| | | |
|---|---|---|
| EP | 0798254 | 10/1997 |
| GB | 468408 | 7/1937 |
| GB | 551569 | 3/1943 |
| GB | 825724 | 12/1959 |
| GB | 2408966 | 6/2005 |

OTHER PUBLICATIONS

International Search Report of corresponding PCT Application No. PCT/IL2006/001274—May 15, 2008—4 pages.

*Primary Examiner* — Alexander Thomas

(74) *Attorney, Agent, or Firm* — Roach Brown McCarthy & Gruber, P.C.; Kevin D. McCarthy

(57) ABSTRACT

A sheet having two opposing sides and a fiber orientation, comprising: a first section on one side of the sheet; and a second section on another the other side of the sheet and substantially parallel to the first section, wherein the sections are not transverse to the fiber orientation of the sheet, and wherein the sections are dimensioned and arranged so that respective separation lines and separation regions formed on the respective sides of the sheet when the sheet is torn result in a homogeneous outlook where respective separation regions are hidden from view.

6 Claims, 18 Drawing Sheets

A - A

A - A

DETACHABLE SHEET

CROSS REFERENCE TO RELATED APPLICATIONS

This application is a Continuation-in-Part of U.S. patent application Ser. No. 12/093,736, filed May 15, 2008, entitled “Detachable Sheet”.

FIELD

The invention relates to a detachable sheet and to apparatuses and methods for rendering the sheet detachable.

BACKGROUND

FIG. 1 schematically illustrates a notepad, according to the prior art. Notepad 10 comprises a plurality of sheets 20. Sheets 20 are banded by binding means. In FIG. 1, the binding means are clamps 40, but other binding means can also be used, such as gluing.

The sheet 20 comprises a perforation line 30, for enabling tearing sheet 20 from notepad 10 over perforation line 30. Thus, perforation line 30 is aimed to provide two functions: to allow tearing the sheet more easily in comparison to a non-perforated sheet and thus enforcing the tearing line to be substantially at the perforation line.

FIG. 2 schematically illustrates an un-torn perforation line 30 of a sheet 20, according to the prior art. The perforation line 30 is comprised of sectioned regions 32 and non-sectioned regions 34. The non-sectioned regions 34 are “short” in order to enable “easy” tearing by a user. The shorter the non-torn region, the easier its tearing. The optimal length of the non-sectioned regions 34 (and the sectioned regions 32 as well) can be determined by experiment. It usually depends on the characteristics of the sheet, such as its thickness, the type of its fibers, and so forth.

FIG. 3 schematically illustrates sheet 20 of FIG. 2 after having been torn, according to the prior art. Tearing sheet 20 separates it into two parts: 20*a*, and 20*b*. As illustrated in FIG. 3, the torn perforation lines 30*a* and 30*b* are not uniform; thus, when tearing sheet 20 at perforation line 30, separated rims 30*a* and 30*b* are neither straight nor “homogeneous”.

Due to the non-esthetic nature of a sheet torn at a perforation line, a plurality of press products cannot be distributed as a notepad. For example, a business card necessarily must be esthetic as possible, and therefore business cards in the prior art are not distributed in a notepad form, but as separate entities which usually reside in a casing, generally a box.

U.S. Pat. No. 7,175,731 to Hansen et al. discloses a method of manufacturing tearable sheets, comprising the steps of: punching each sheet transversely of the fibers of said sheet from a first side of the sheet to an extent corresponding to a first portion of the thickness of the sheet; and punching each sheet transversely of the fibers of said sheet from a second side of the sheet to an extent corresponding to a second portion of the thickness of said sheet. (Abstract)

Another implementation which cannot be embodied as a perforated sheet is a postcard featuring a landscape. Generally, landscape postcards are distributed as single entities, or in connection with a plurality of postcards.

SUMMARY

In one aspect, the present invention is directed to a sheet comprising: a first section on one side of the sheet; and a second section on the other side of the sheet and parallel to the first section; wherein the distance between the tip of the first section and the tip of the second section being substantially greater than zero, thereby upon applying a force along the tips, detaching the sheet between the tips.

In one embodiment of the invention, the first section and the second section are rendered along the entire length of the sheet.

Preferably, the sheet is banded in a notepad.

The sheet may be of a business card, a postcard, a greeting card, a landscape card, and so forth.

In another aspect the present invention is directed to a method for rendering a sheet detachable, the method comprising the steps of: rendering a first section on one side of the sheet; and rendering a second section on the other side of the sheet parallel to the first section; wherein the distance between the tip of the first section and the tip of the second section is substantially greater than zero, thereby applying a force along the tips resulting with detaching the sheet between the tips.

In yet another aspect, the present invention is directed to an apparatus for rendering a sheet detachable, the apparatus comprising: a sectioning mechanism, for rendering a first section on one side of the sheet and optionally rendering a second section on the other side of the sheet and parallel to the first section; thereby upon applying a force along the tips, detaching the sheet.

In one embodiment of the invention, the sectioning mechanism comprises at least one blade, for rendering the sections.

The sectioning mechanism may comprise a supporting mechanism, for supporting the sheet, and/or a moving mechanism, for changing the position of the at least one blade with reference to the supporting mechanism, for rendering the sections.

Changing the position of the at least one blade with reference to the supporting mechanism may be carried out: by moving the at least one blade toward the sheet; by moving the at least one blade along the sheet; by moving the sheet toward the at least one blade; by moving the sheet along the at least one blade, and so on.

In yet another aspect, the present invention is directed to a sheet comprising: a section on one side of the sheet in which the shortest distance between the tip of the section and the un-sectioned edge of the sheet being substantially greater than zero, thereby upon applying a force along the section, detaching the sheet between the tip and the edge.

In yet another aspect, the present invention is directed to a method for rendering a sheet detachable, the method comprising the steps of: rendering a section on one side of the sheet, wherein the shortest distance between the tip of the section and the un-sectioned edge of the sheet being substantially greater than zero, thereby upon applying a force along the section, detaching the sheet between the tip and the edge.

In yet another aspect, the present invention is directed to a system for distributing a notepad having content such as business card and landscape postcard, the system comprising: a server accessible over the Internet, for accepting an order from a client to produce the notepad; a press machine, for printing the content on the sheets of the notepad; and a sectioning apparatus, for rendering a sheet detachable. The apparatus may comprise: a sectioning mechanism, for rendering a first section on one side of the sheet and optionally a second section on the other side of the sheet.

The system may further comprise a software application, for designing the content. The software application may be adapted to operate as a web page, to operate as a stand-alone program, and so forth.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

Figure 10:
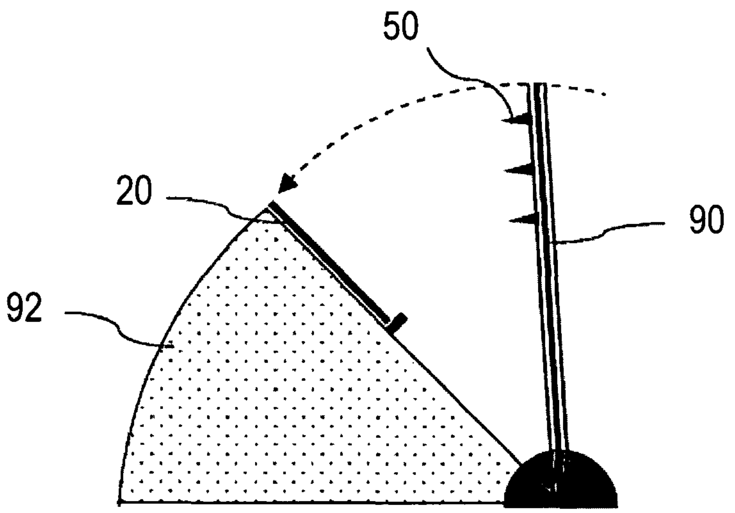
Figure 11:
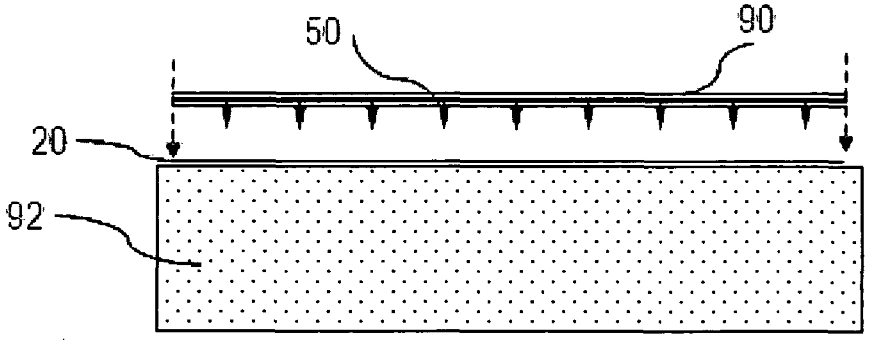
Figure 12:
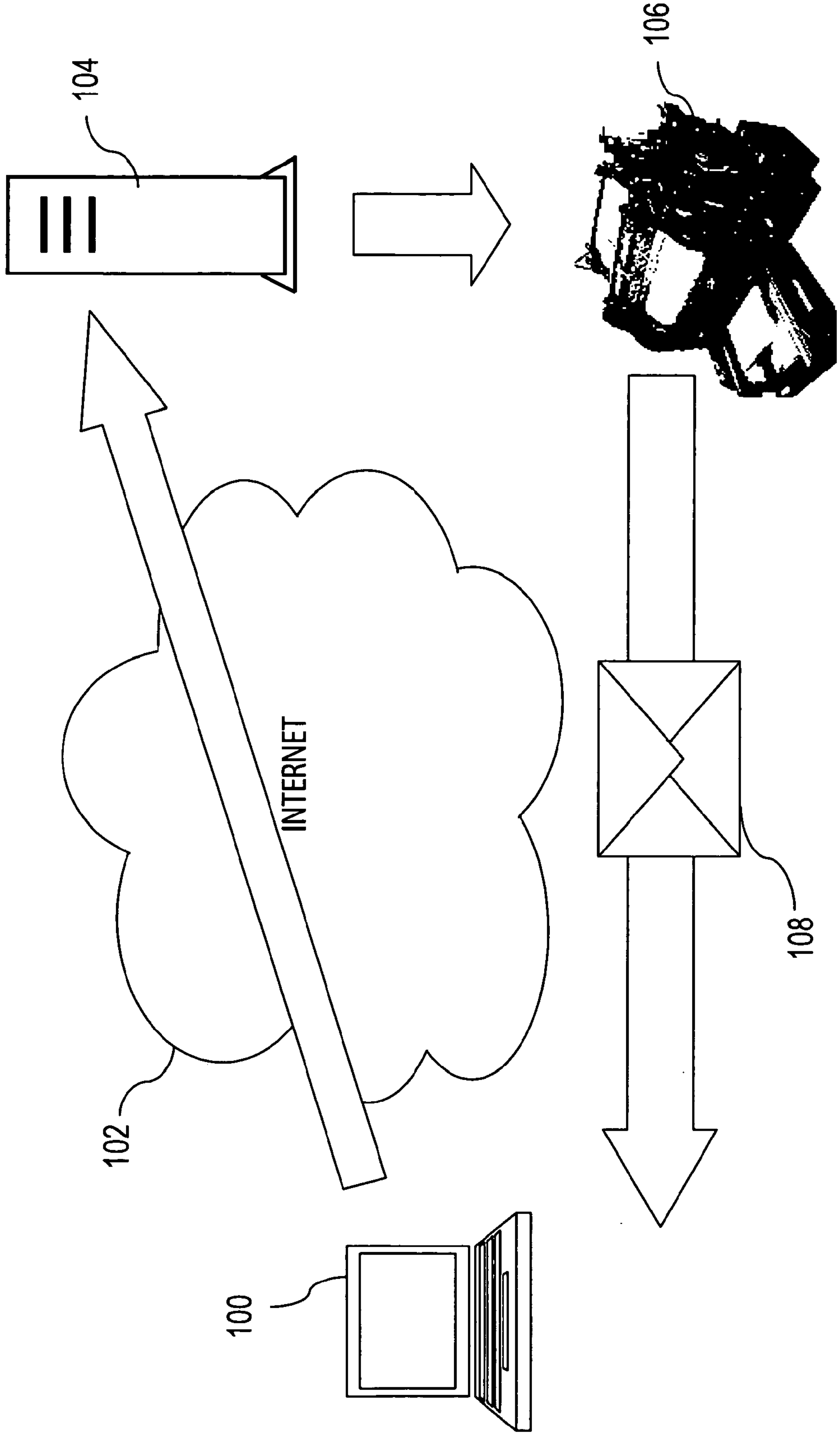
Figure 13:
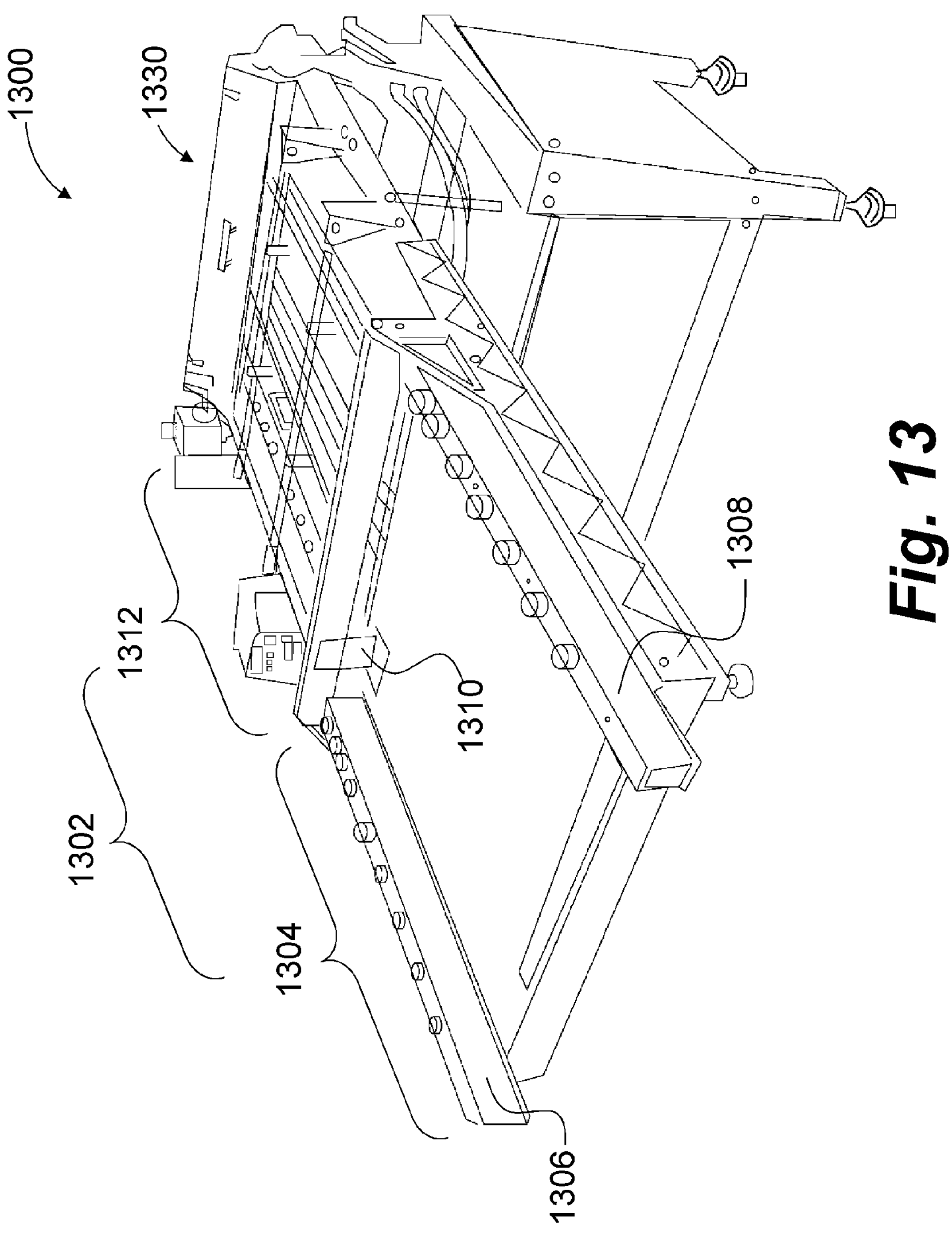
Figure 14:
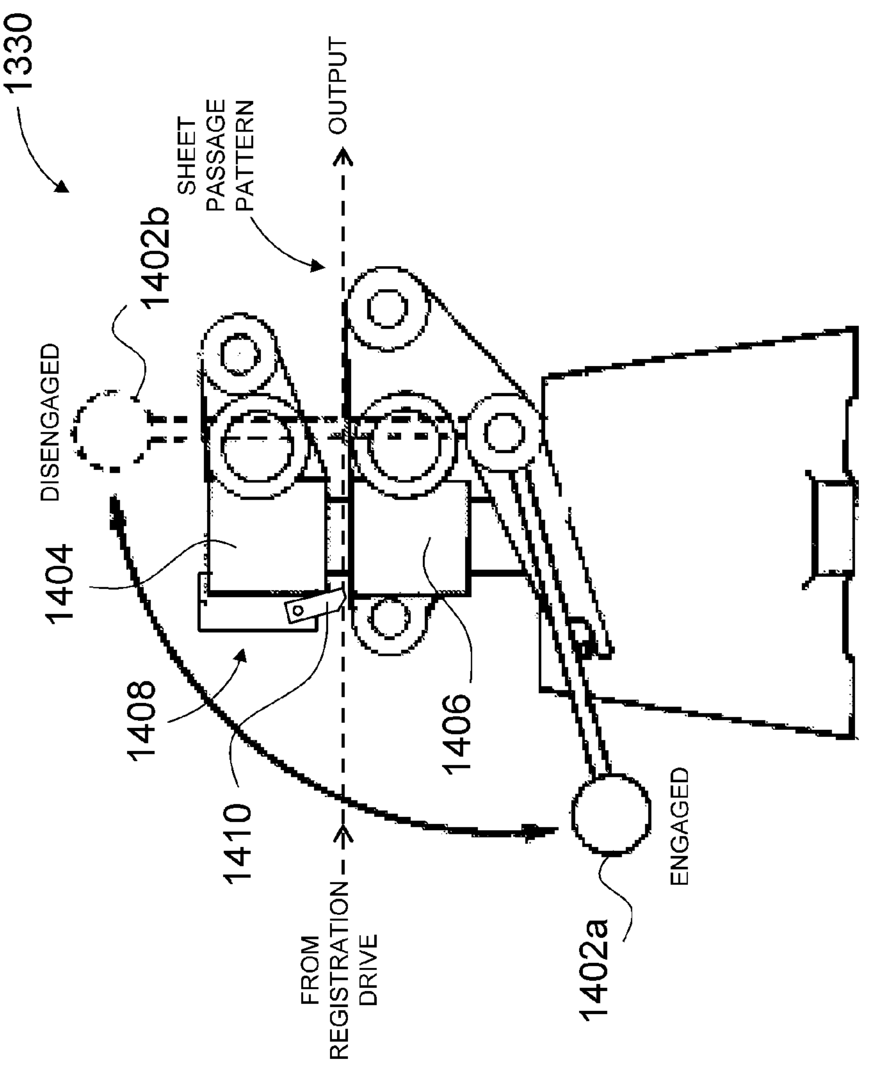
Figure 15:
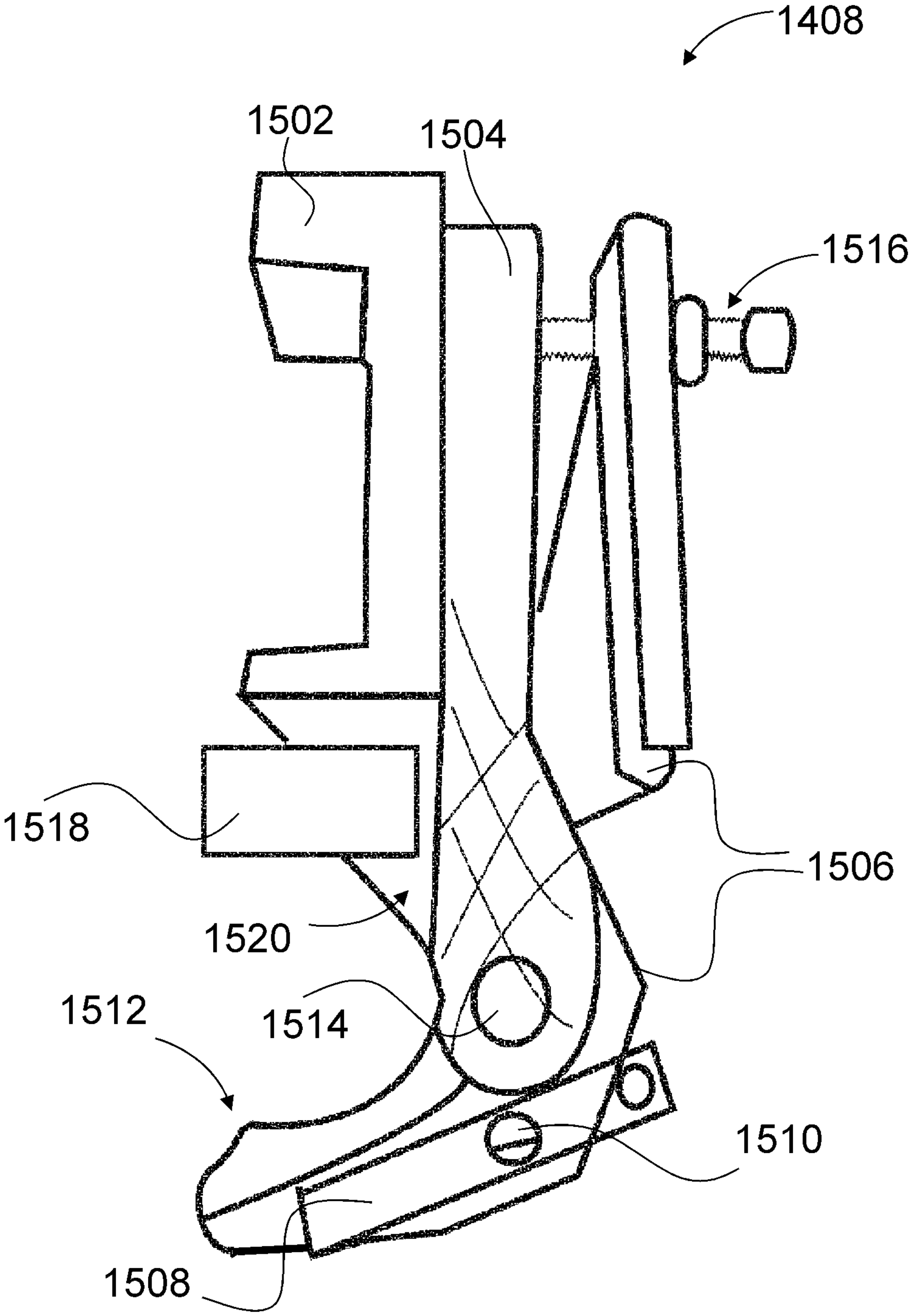
Figure 16:
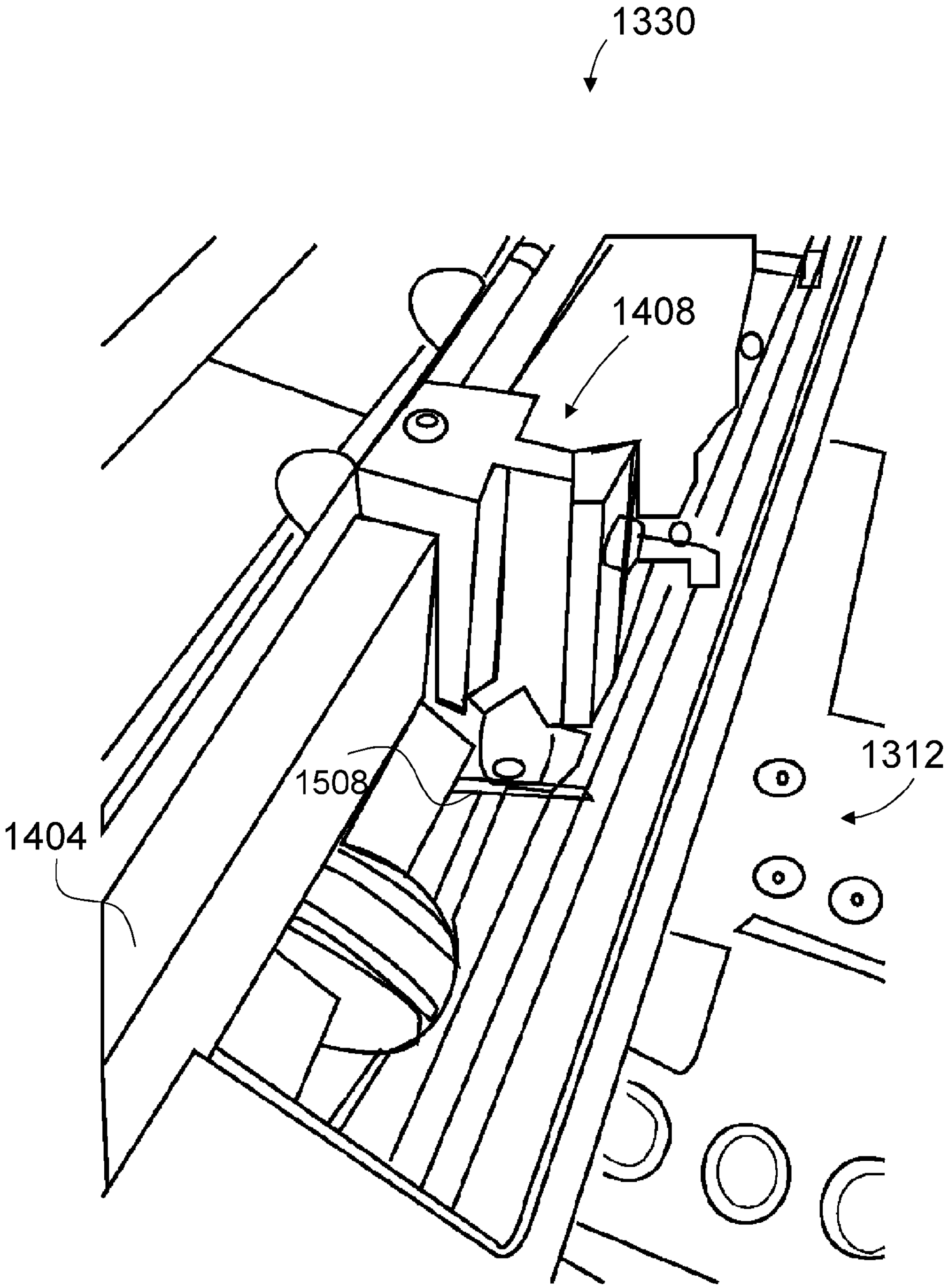
Figure 18:
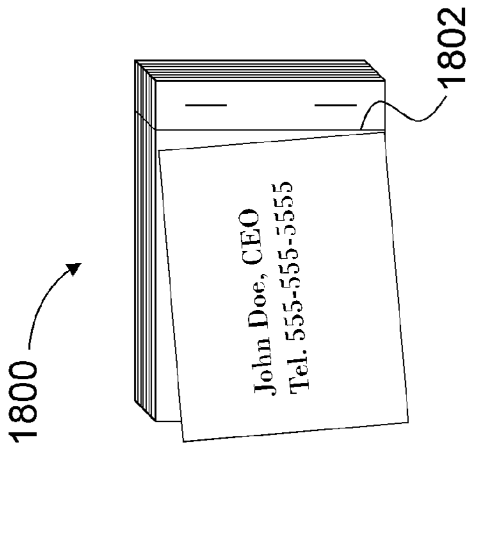
Figure 17:
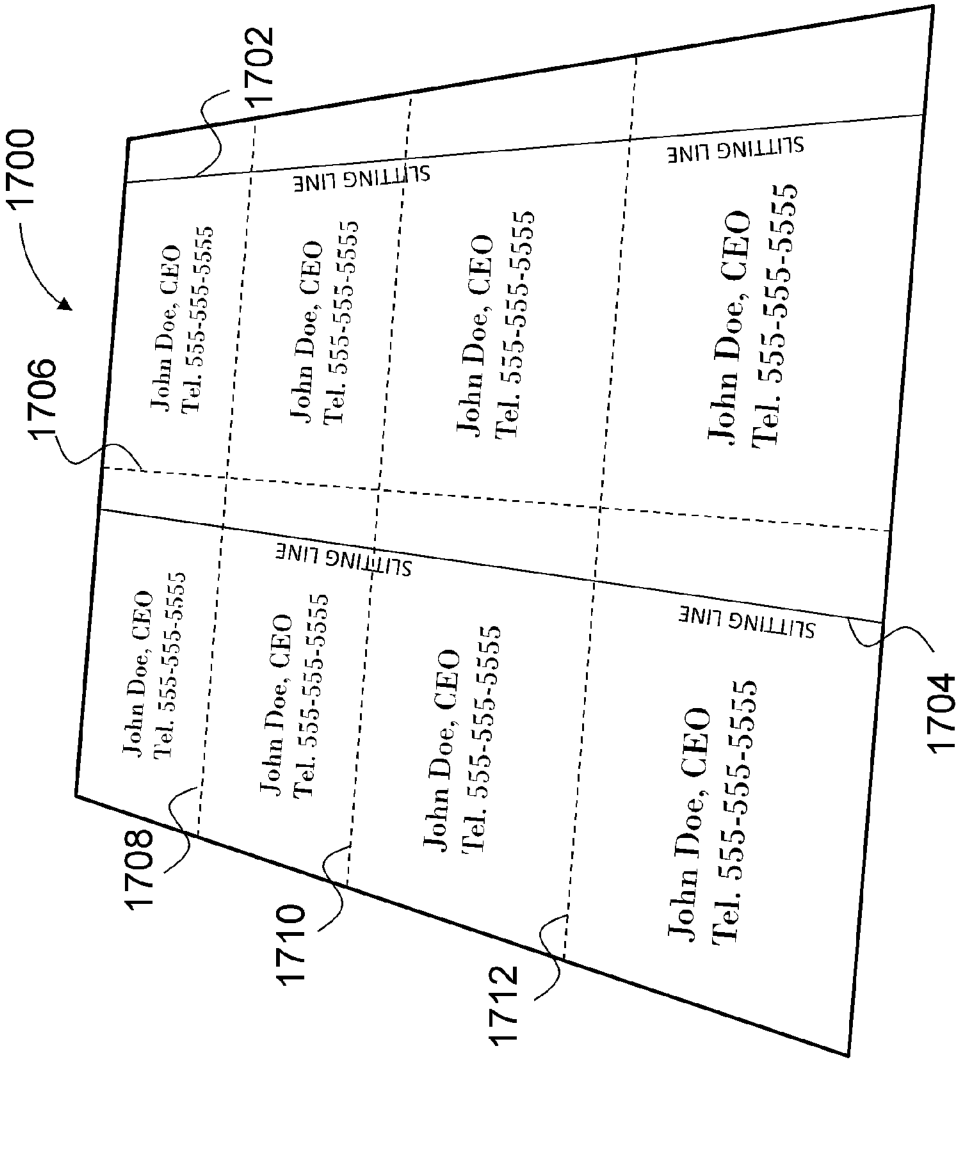

Each of FIGS. 9*a* to 9*e* schematically illustrate a cross-section (such as cross-section A-A of FIG. 6), according to embodiments of the invention;

FIG. 10 schematically illustrates an apparatus for rendering a sheet detachable, according to an embodiment of the present invention;

FIG. 11 schematically illustrates an apparatus for rendering a sheet detachable, according to another preferred embodiment of the present invention;

FIG. 12 schematically illustrates a system for distributing a notepad of business cards, according to one embodiment of the invention;

FIG. 13 shows a perspective view of an exemplary slitting apparatus;

FIG. 14 shows a schematic side-view illustration of an exemplary sheet slitting unit;

FIG. 15 shows a schematic side-view illustration of an exemplary blade assembly;

FIG. 16 shows a perspective view of a portion of an exemplary sheet slitting unit;

FIG. 17 shows an exemplary sheet demonstrating two straight slitting lines;

FIG. 18 shows an exemplary business card notebook; and

Figure 19:
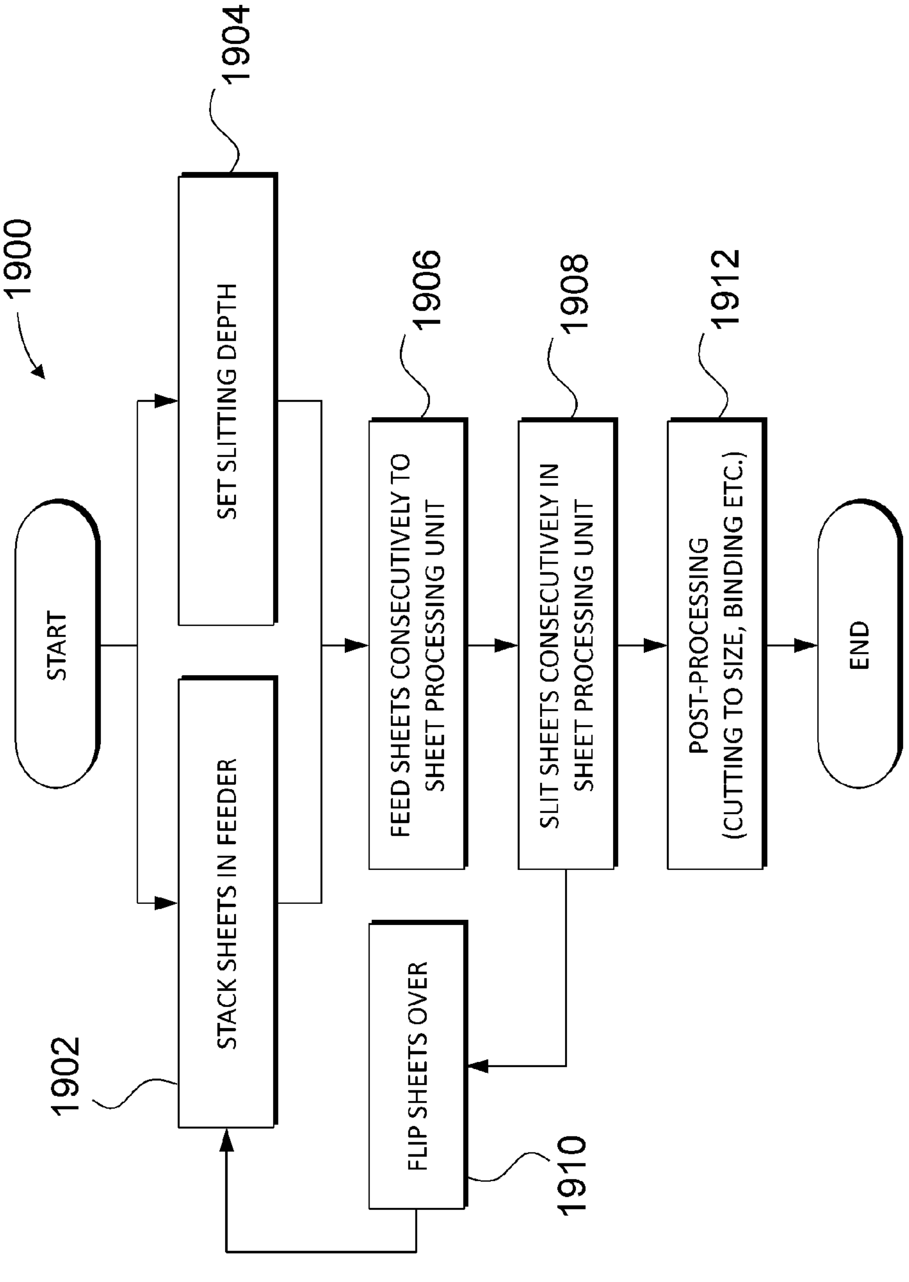

FIG. 19 shows a flow chart of a method for processing a sheet to render the sheet detachable.

DETAILED DESCRIPTION

Glossary

The term "sheet", as referred to herein, may relate to a sheet made of paper or polymer, or a combination of both. In the case of a paper sheet, the sheet may be of the type having a prominent fiber orientation, namely—the majority or a substantial part of the elongated fibers forming the sheet may be similarly aligned. This alignment is a product of the manner much of the paper is produced today. However, paper is sometimes produced such that its fibers are randomly-oriented; this type of paper is often referred to, in the art, as "lacking a fiber orientation". In some embodiments, sheets having a certain fiber orientations are used. In other embodiments, sheets with randomly-oriented fibers are used. In yet further embodiments, polymeric, fiberless, sheets are used.

Generating a Perforation Line According to the Prior Art

Figure 1:
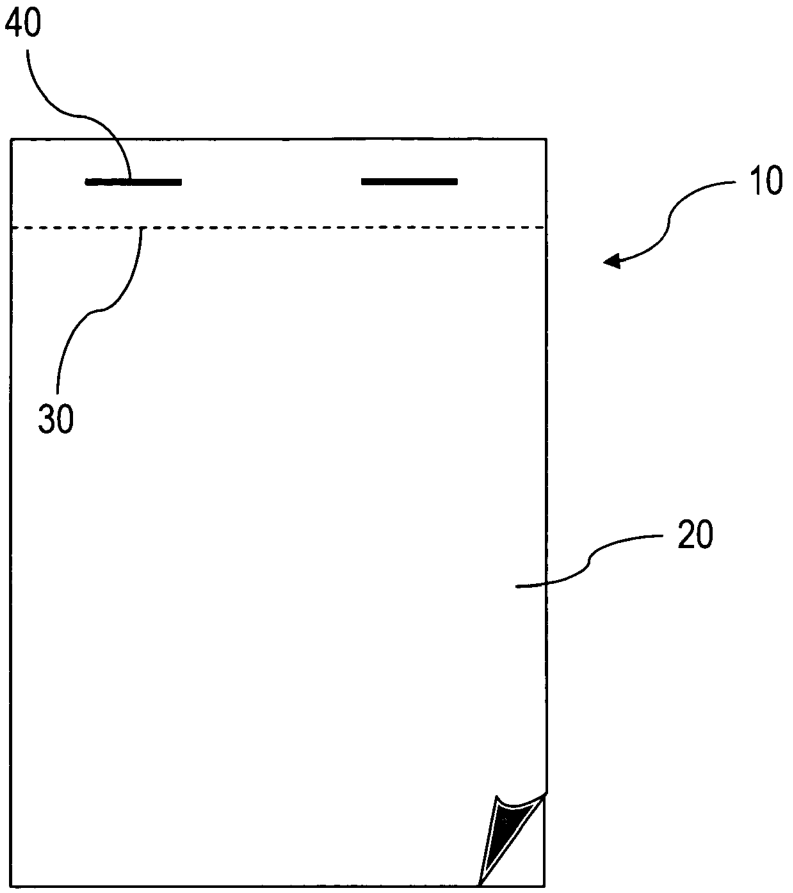
Fig. 1 Prior art
FIG. 1 schematically illustrates a notepad, according to the prior art.
Figure 2:
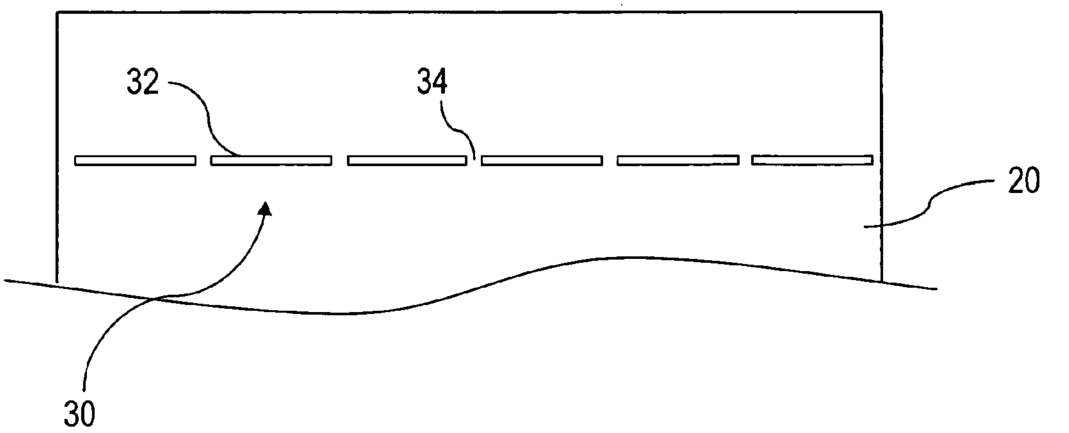
Fig. 2 Prior art
FIG. 2 schematically illustrates an un-torn perforation line 30 of a sheet 20, according to the prior art.
Figure 3:
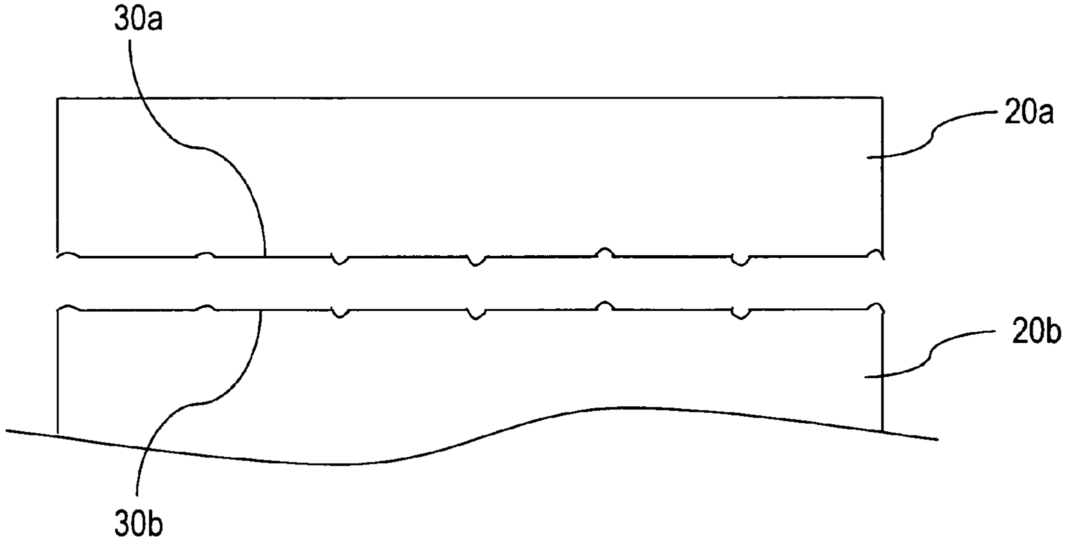
Fig. 3 Prior art
FIG. 3 schematically illustrates sheet 20 of FIG. 2 after having been torn, according to the prior art.
Figure 4B:
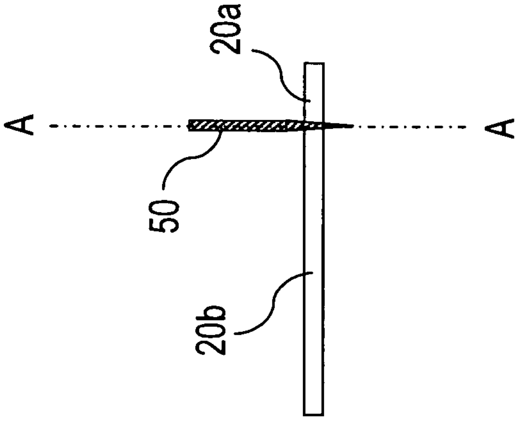
Fig. 4b Prior art
FIGS. 4*a* and 4*b* schematically illustrate the way a perforation line is executed, according to the prior art.
Figure 4A:
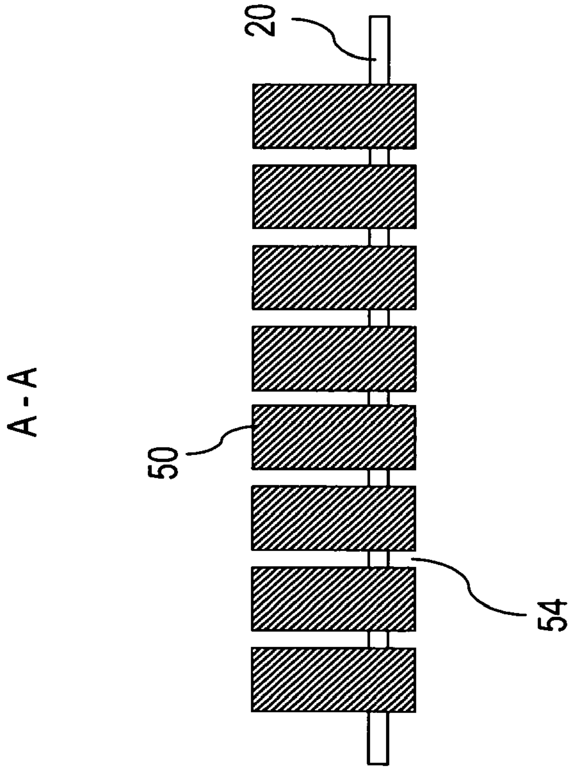
Fig. 4a Prior art

FIGS. 4*a* and 4*b* schematically illustrate the way a perforation line, such as line 30 of FIG. 2, is executed, according to the prior art. FIG. 4*a* is a cross-section along the perforation line, and FIG. 4*b* is a side cross-section thereof FIG. 4*a* is section A-A of FIG. 4*b*.

The perforation line is executed by piercing sheet 20 with a group of blades 50. The result is a perforation line, such as line 30 of FIG. 2.

Each blade 50 of FIG. 4*a* corresponds to an executed section, such as section 32 of FIG. 2. A distance 54 separates two adjacent blades 50, resulting in non-sectioned regions, such as non-sectioned regions 34 of FIG. 2.

Performing Section Lines, According to an Embodiment of the Invention

Figure 5B:
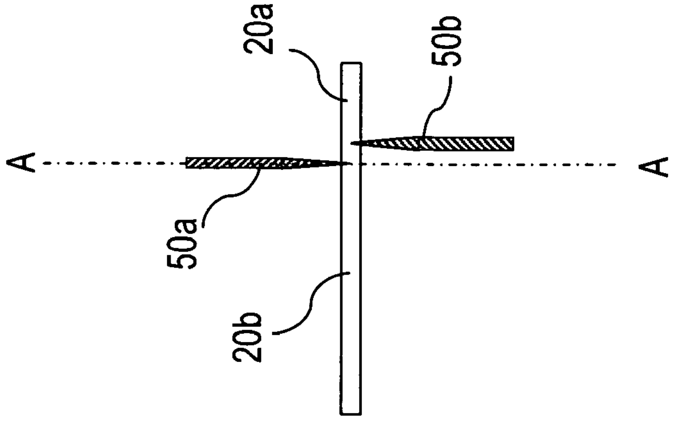
FIGS. 5*a*, 5*b* and 5*c* schematically illustrate the way section lines are executed, according to an embodiment of the invention.
Figure 5A:
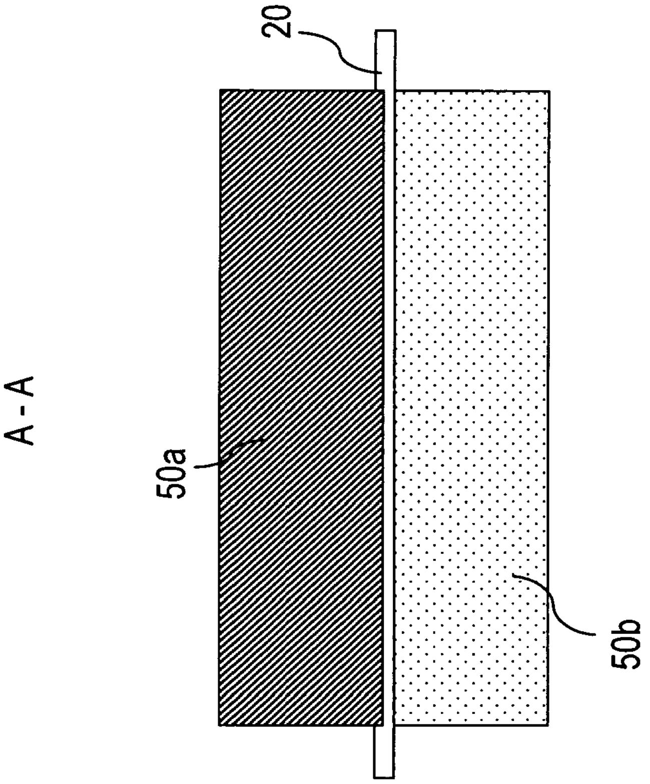
Figure 5C:
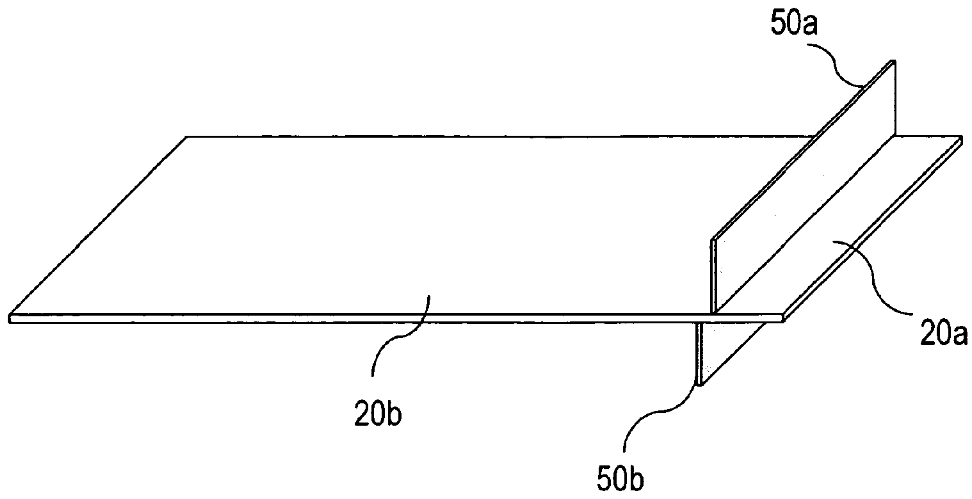

FIGS. 5*a*, 5*b* and 5*c* schematically illustrate the way section lines are executed, according to an embodiment of the invention. FIG. 5*a* is section A-A of FIG. 5*b*. FIG. 5*c* is a three-dimensional view thereof.

As can be seen in FIG. 5*a*, there are two blades 50*a* and 50*b*, for executing two opposite sections along sheet 20: a first blade 50*a* for executing an elongated section on one side of the sheet 20, and a second blade 50*b*, for executing an elongated section on the other side of the sheet 20.

The sectioning need not necessarily be carried out simultaneously. According to one embodiment of the invention, a section is carried out at one side of the sheet 20, and afterwards the sheet 20 is turned upside-down, and a section is carried out on the other side of the sheet 20.

Figure 6:
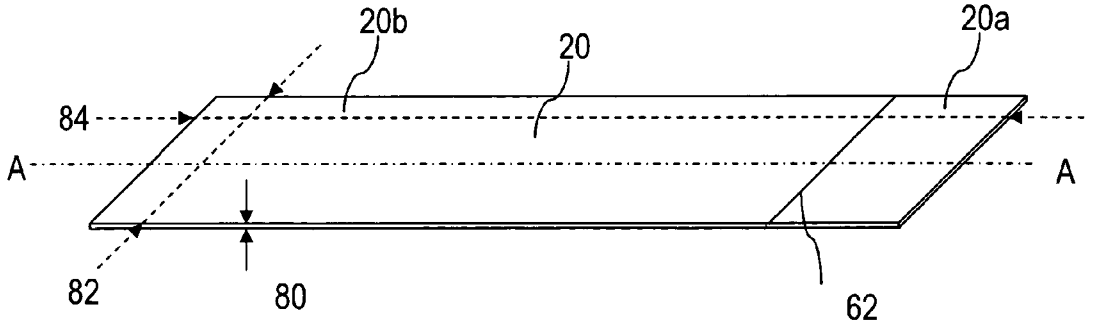
FIG. 6 is a three-dimensional view of a sheet 20, which illustrates some terms used herein.

FIG. 6 is a three-dimensional view of a sheet 20, which illustrates some terms used herein. The thickness of sheet 20 is marked as 80. The length of the sheet 20 is marked as 84, and the width of sheet 20 is marked as 82. Marker 62 denotes the section performed by blade 50*a* (of FIG. 5*c*). The "width" 82 of sheet 20 refers to the dimension of sheet 20 which is substantially parallel to the section line 62.

Figure 7A:
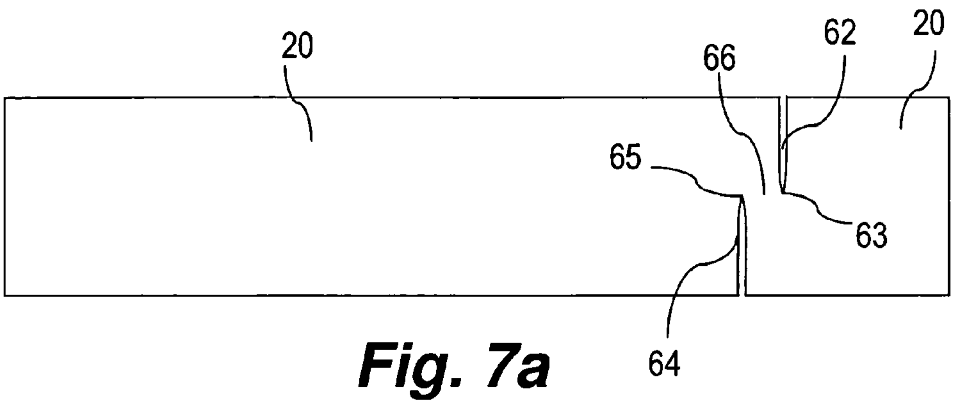
FIG. 7*a* is a sectional view of cross-section A-A of FIG. 6, according to an embodiment of the invention.
Figure 7B:
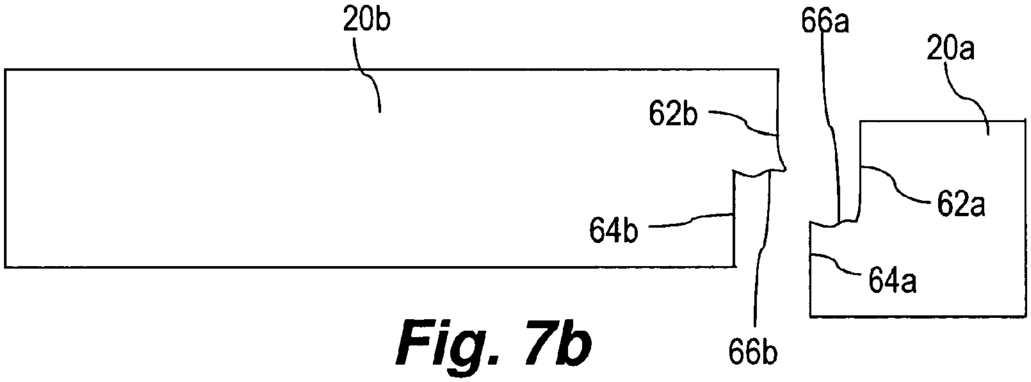
FIG. 7*b* is a sectional side-view of sheet 20 of FIG. 7*a*, after being torn.
Figure 7C:
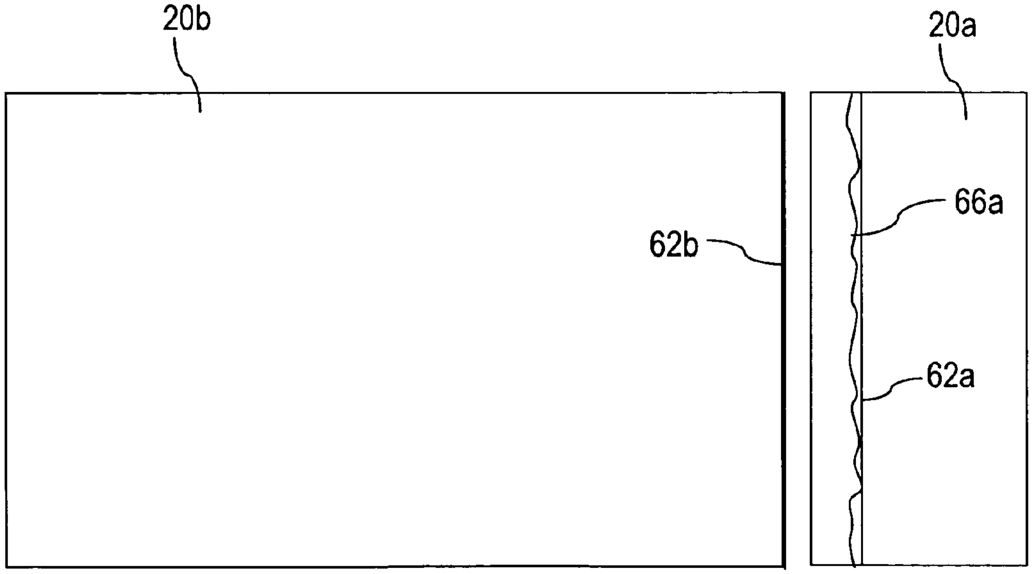
FIG. 7*c* is a top view of the torn sheet 20 of FIG. 7*b;*

FIG. 7*a* is a sectional view of cross-section A-A of FIG. 6, according to an embodiment of the invention. FIG. 7*b* is a sectional side-view of sheet 20 of FIG. 7*a*, after being torn. FIG. 7*c* is a top view of the torn sheet 20 of FIG. 7*b*.

Sheet 20 is sectioned by 62 and 64. Marker 66 denotes the "region" between tip 63 of section 62 and tip 65 of section 64. In other words, when it applies to a cross-section, marker 66 denotes an imaginary line between tips 33 and 35.

Upon applying a force along region 66, sheet 20 separates into two parts 20*a* and 20*b* at region 66, as illustrated in FIGS. 7*b* and 7*c*. The sections of each section pair, namely—two corresponding sections, one on each side of sheet 20, are substantially parallel and are adjacent. The term "adjacent" may refer to a distance which is a balanced tradeoff allowing for the two following benefits: (a) the distance is not too great, such that tearing sheet 20 requires only a reasonable amount of manual force and that, when tearing the sheet, it tears between the sections and not elsewhere; and (b) the distance is not too little, so as to retain the advantage of hiding any unappealing tear marks. Generally, a sheet with fibers that tend to loosen when the sheet is torn would suggest that a greater distance may be needed to hide the loose fibers, and vice versa.

In some embodiments, the distance between corresponding, parallel sections equals twice the thickness of the pertinent sheet or less. In some embodiments, the distance equals 175% or less of the thickness of the pertinent sheet. In some embodiments, the distance equals 150% or less of the thickness of the pertinent sheet. In some embodiments, the distance equals 125% or less of the thickness of the pertinent sheet. In some embodiments, the distance equals the thickness of the pertinent sheet or less. In some embodiments, the distance equals 75% or less of the thickness of the pertinent sheet. In some embodiments, the distance equals 50% or less of the thickness of the pertinent sheet. In some embodiments, the distance equals 25% or less of the thickness of the pertinent sheet.

The applied force may be of a tearing nature (i.e., pulling parts 20*a* and 20*b* of the sheet 20 along line 66 in opposite directions), bending force, and so forth.

The imaginary line between tips 63 and 65 is marked herein as 66, and referred to as "separation region" (in a sectional view) or "separation line"/"detachment line" (when it refers to the entire width of the sheet 20).

Reference is made now to FIGS. 7*a*, 7*b* and 7*c*. Upon tearing sheet 20 along separation line 66, sheet 20 separates into two parts, 20*a* and 20*b*. The separation region of part 20*a* along section 62 is marked as 62*a*, and its corresponding region of part 20*b* is marked as 62*b*. The separation region of part 20*a* along section 64 is marked as 64*a*, and its corresponding region of part 20*b* is marked as 64*b*. The separation region of part 20*a* is denoted as 66*a*. The separation region of part 20*b* is marked as 66*b*.

While edges 62*a*, 62*b*, 64*a* and 64*b* are a result of a section, regions 66*a* and 66*b* are the result of tearing, and therefore, while lines 62*a*, 62*b*, 64*a* and 64*b* have a "straight" and "homogeneous" outlook, the outlook of lines 66*a* and 66*b* is neither "straight" nor "homogeneous". But, as illustrated in FIG. 7*c*, which is a top view of the torn sheet 20 of FIG. 7*b*, this defect is hidden in top-view. In other words, the torn region 66*b* is hidden. Although torn region 66*b* is visible, the meaningful part of sheet 20 is 20*b*, which may be a business card, a landscape postcard, and so forth, is hidden.

Figure 8A:
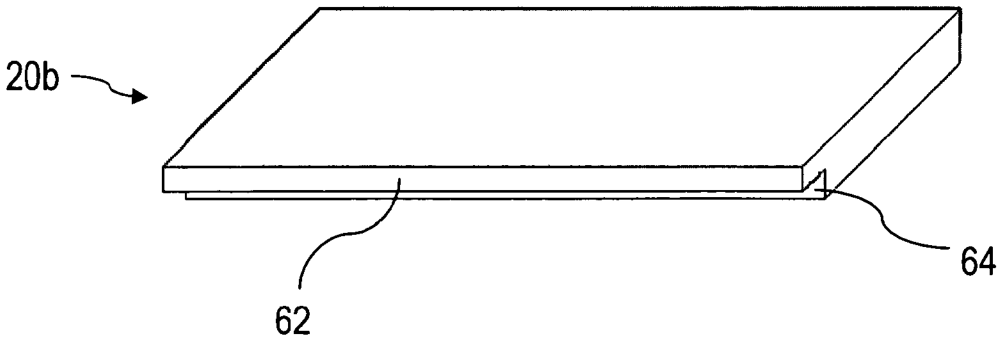
FIG. 8*a* is a three-dimensional view of part 20*b* which has been detached from part 20*a*, according to an embodiment of the invention.
Figure 8B:
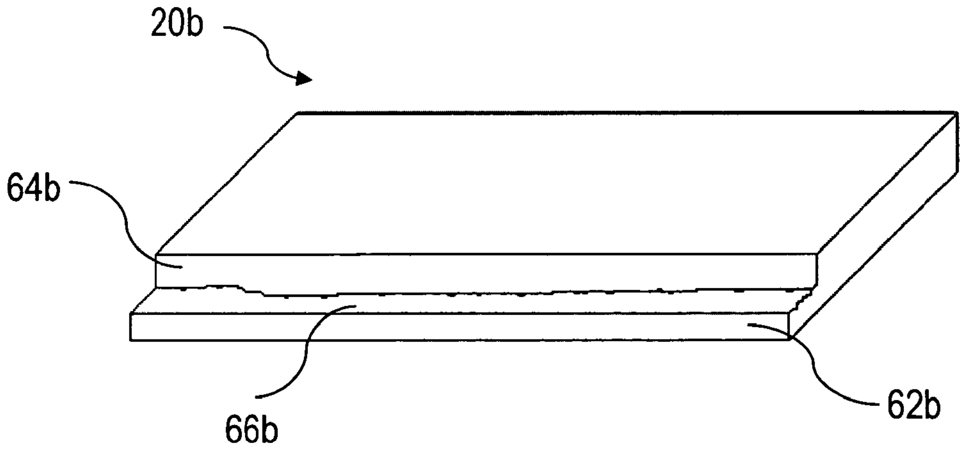
FIG. 8*b* is a three-dimensional view of the detached part 20*b* which has been turned upside-down, according to an embodiment of the invention.

FIG. 8*a* is a three-dimensional view of part 20*b* which has been detached from part 20*a*, according to an embodiment of the invention. FIG. 8*b* is a three-dimensional view of the detached part 20*b* which has been turned upside-down, according to an embodiment of the invention.

As illustrated, while the torn line 66*b* is seen in the upside-down view of FIG. 8*b*, in FIG. 8*a* torn line 66*b* is hidden. The fact that the torn line is hidden from a top-view, all the edges of part 20*b* are therefore "straight" and "homogeneous". Experimental results show that, in accordance with present embodiments, in order to obtain such straight and homogenous-looking edges, the sections may be carried out, surprisingly, even substantially parallel to the fiber orientation (namely, not transverse to the fiber orientation). This stands in contrast to prior teachings, such as those by U.S. Pat. No. 7,175,731 to Hansen et al., according to which sections are made transverse to the fiber orientation in order to achieve the appealing look desired in many applications, such as detachable business cards, postcards etc.

According to present embodiments, even when making sections aligned parallel to the fiber orientation of the sheet, no substantial appearance of loose fibers is exhibited across the section line, which still looks substantially straight to the naked eye. An instant advantage of these findings is that sheets may be fed into a punching/slitting apparatus being oriented such that the sections are rendered parallel to the fiber orientation.

Another advantageous implication of the present experimental findings is that sheets do not have to be deliberately oriented in the process. Namely, the professional who manually feeds the sheets to a punching apparatus or who manually stacks the sheets to an automatic feeder of a punching/slitting apparatus, does not have to invest effort and care into making sure sheets are "correctly" oriented before sections are rendered. This professional may feed or stack the sheets regardless of their fiber orientation. As well-known in the press field, printing (or finishing) tasks which require feeding or stacking sheets at a certain fiber orientation may be considerably slower and more prone to costly errors than tasks which are indifferent to the fiber orientation.

A further advantageous implication of the present experimental findings is that sheets with randomly-oriented fibers may be successfully used, and exhibit straight-looking edges after sectioned and detached. Namely, even those of the fibers that so happened to be oriented parallel to the section, do not essentially degrade the straight look of the edge.

According to one embodiment of the invention, the sections made in the opposite sides of the sheet are substantially parallel, thus leaving substantially the same distance between the tips of the sections. However, it should be understood that the sections do not necessarily have to be parallel.

Sectioning Forms

Each of FIGS. 9*a* to 9*e* schematically illustrate a cross-section (such as cross-section A-A of FIG. 6), according to embodiments of the invention. In these embodiments, the depth of sections 62 and 64 constitutes about a third of the thickness of the sheet 20. However, this is only an example, and other proportions may be used, as well.

Figure 9A:
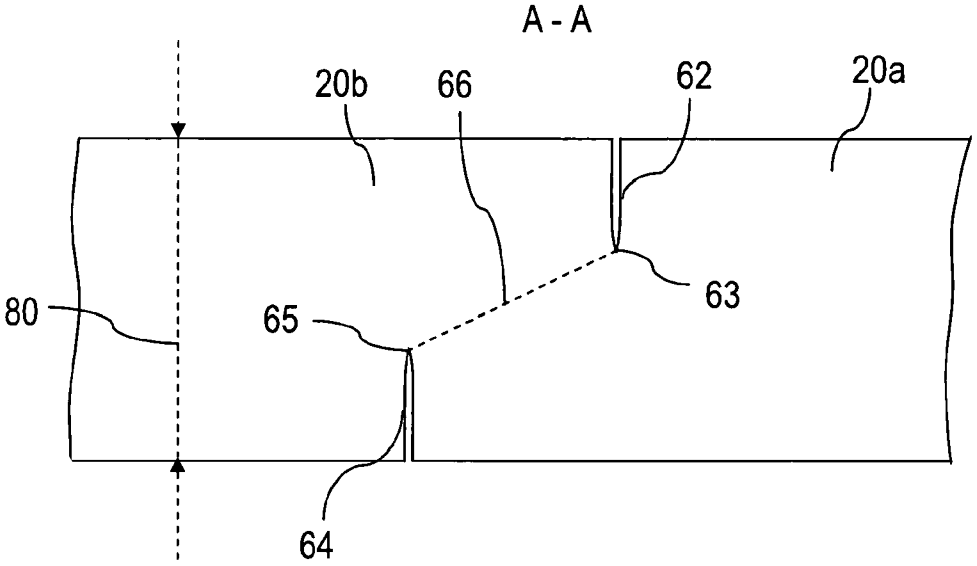

In the embodiment of FIG. 9*a* the planes of sections 62 and 64 are perpendicular to the plane of sheet 20, and therefore they are parallel each to other. However, the planes of sections 62 and 64 are not on the same plane. The advantage of this embodiment is that separation line 66 of a torn sheet is hidden from view from one side of the sheet, although it may be seen from the other side of the sheet.

Figure 9B:
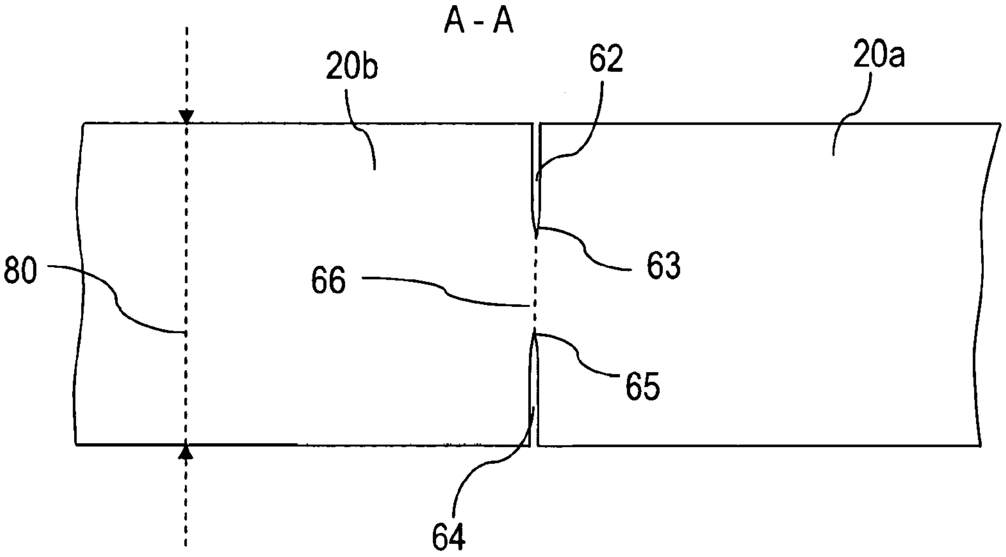

In the embodiment of FIG. 9*b*, the planes of sections 62 and 64 are on the same plane. The drawback of this embodiment is that the separation line of a torn sheet is seen from both sides of the sheet.

Figure 9C:
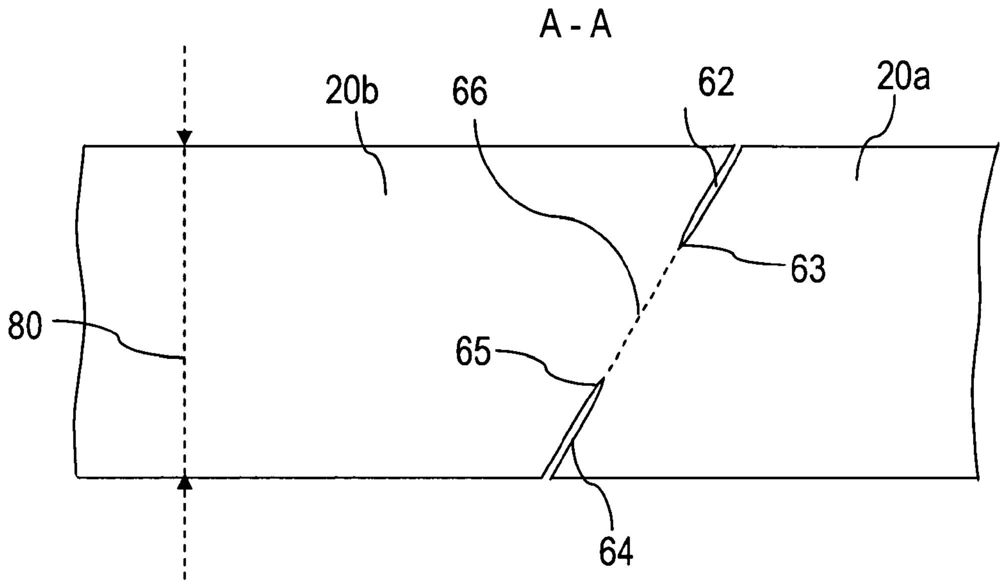

In the embodiment of FIG. 9*c*, the planes caused by sections 62 and 64 are not perpendicular to the plane of sheet 20, but are on the same plane. The advantage of this embodiment is that the separation line of a torn sheet is hidden in view from one side of the sheet, although it is viewable from the other side of the sheet. Furthermore, since the sections are on the same plane but in opposite directions, both sections can be executed simultaneously.

Figure 9D:
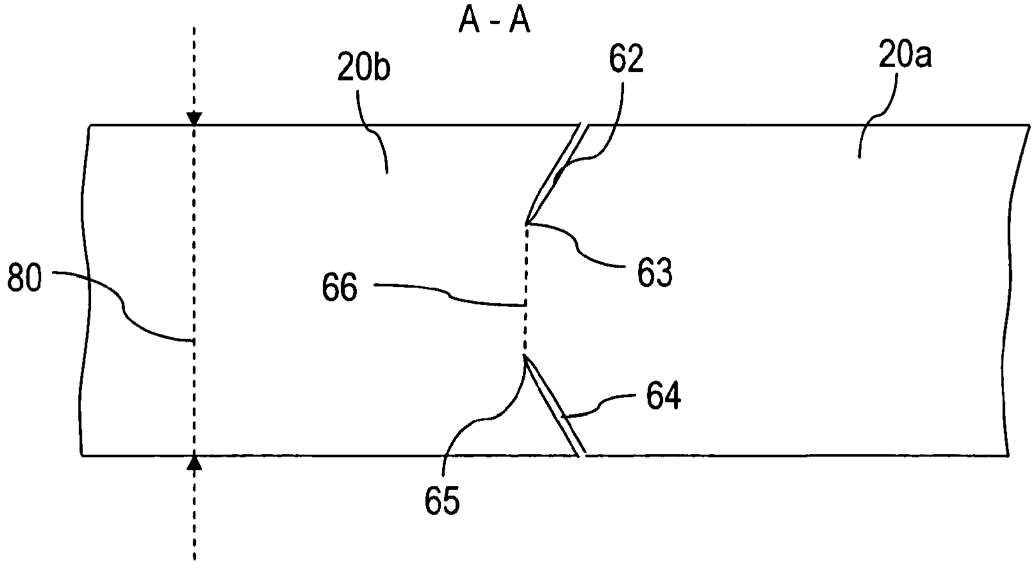

In the embodiment of FIG. 9*d* the planes caused by sections 62 and 64 are not perpendicular to the plane of sheet 20, and not parallel each to one another. The advantage of this embodiment is that the separation line of a torn sheet is hidden from view from both sides of part 20*b* of the sheet.

Figure 9E:
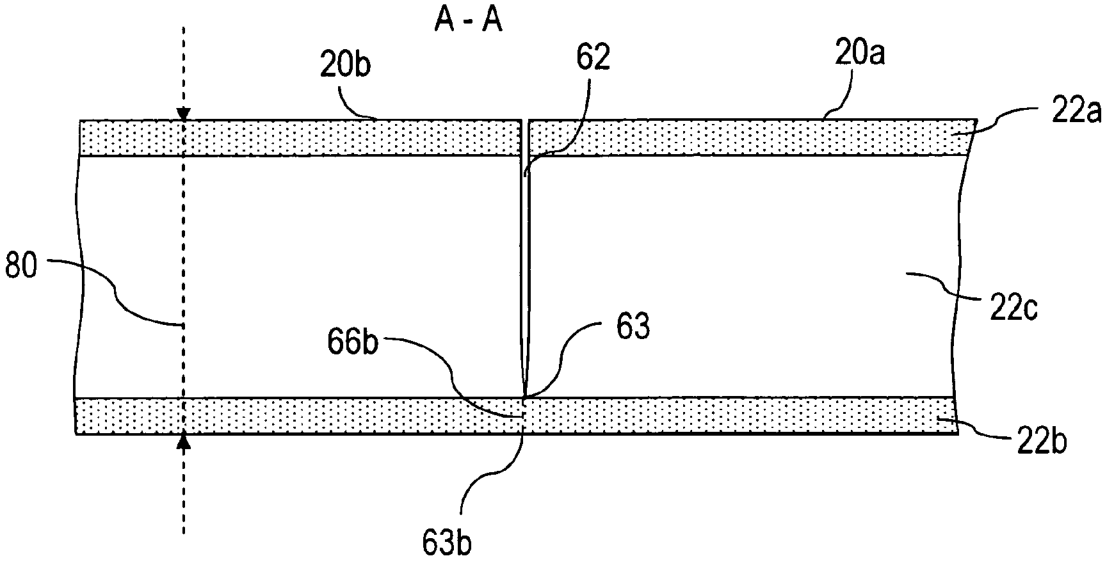

The embodiment of FIG. 9*e* may be applied to a sheet which the fibers of its external layers 22*a* and 22*b* are more condensed than the fibers of its internal layer 22*c*. Such sheets are very common for business cards.

In this embodiment only one section is required, in contrast to the two sections required in the embodiments of FIGS. 9*a* to 9*d*. The section is marked as 62. The section 62 should not cut the entire layer 22*c*, but rather leave at least a part of the external layer 22*b* un-sectioned. The un-sectioned part is marked as 66*b*.

A bending force along the section line 62 results with breaking the sheet (into parts 20*a* and 20*b* along its section line 62 at the region between tip 63 of the section 62 to the nearest point at the edge of sheet 63*b*, i.e., line 66*b*). This is in contrast to the embodiments of FIGS. 9*a* to 9*d* in which the sheet is torn. Nevertheless in this embodiment the breaking line is straight and "homogeneous", due to the nature of the fibers which the external layers of the sheet are made of.

As in the embodiments of FIGS. 9*a* to 9*d*, in the embodiment of FIG. 9*e* the section may be perpendicular to the sheet plane, or in an angle with the sheet plane.

A major advantage of this embodiment is that only one section is carried out in contrast to the embodiments of FIGS. 9*a* to 9*d*, and therefore the required work thereof diminishes.

A desired distance 66 (i.e., the distance between the lines of the rims 63 and 65 of the sections) may be determined by experiments. According to experiments carried out by the applicant, the desired distance 66 depends on characteristics such as the thickness of the sheet, the fibers of the sheet, the direction of the sections, and so forth.

FIG. 10 schematically illustrates an apparatus for rendering a sheet detachable, according to an embodiment of the present invention. FIG. 11 schematically illustrates an apparatus for rendering a sheet detachable, according to another embodiment of the present invention.

The apparatus comprises: a supporting mechanism 92, on which the sheet 20 is placed; an approaching mechanism 90, for approaching the blades 50 to the sheet (or alternatively approaching the sheet to the blades); and a feeder, for placing the sheet on the support mechanism, and removing the sheet 20 from the supporting mechanism.

In the embodiment of FIG. 10, the approaching mechanism 90 is based on rotational movement, while in the embodiment of FIG. 11, approaching mechanism 90 is based on linear movement. The movement lane is illustrated in FIGS. 10 and 11 as a dashed arrow.

As mentioned above, the approaching mechanism may approach the blades to the sheet, as illustrated on FIGS. 10 and 11, or approach the sheet to the blades (not illustrated).

Those skilled in the art will appreciate that feeders are well known in the art of press, and for the sake of simplicity they have not been illustrated in the figures herein.

In the embodiments of FIGS. 10 and 11 the operation of "punching" a sheet must be carried out twice: once for rendering a section on one side of the sheet, and afterwards on the other side of the sheet. Thus, when using the same apparatus for punching both sides of a sheet, the sheet has to be fed twice, the first for punching one side, and the second for punching the second side.

According to another embodiment of the invention, the sections of both sides of a sheet are carried simultaneously. A mechanism for rendering sections on both sides of a paper simultaneously, may be based on two approaching mechanisms, one for each side of the paper, and each having its own blades. Such a mechanism is not illustrated herein.

A section may be carried out by "punching", as illustrated in FIGS. 10 and 11, by cutting, and so forth. For example, in an embodiment, one or more sections may be carried out by cutting a sheet to a portion of its thickness (also referred to as "slitting") using one or more blades, the sheet and the blade(s) being in motion relative to one another. Since, as discussed, sections (also "slits") on the both sides of the sheet may be required for rendering it detachable, the sheet may be passed over the blade(s) twice, one pass for each side. Alternatively, a slitting apparatus may be configured to make slits in both sides of the sheet in a single run.

Reference is now made to FIG. 13, which shows a perspective view of an exemplary slitting apparatus 1300. For reasons of simplicity, exemplary slitting apparatus 1300 shown here is the commercially-available Advantage machine, manufactured by Rollem Patent Products Ltd. of Sheffield, England. The Advantage is a fast finishing machine for the print industry, capable of rapidly passing sheets through various sheet processing units which are configured, for example, to slit, trim, bleed and semi-slit, perforate, micro-perforate and slit-perforate the sheets. Further information on the Advantage machine and its usage may be found in Rollem Patent Products, *Instruction Manual: Advantage*, Sheffield, England, ref. no. 91P-0403, issue 1. This document is incorporated herein by reference. Those of skill in the art, however, will recognize that present embodiments may also be carried out by a different machine, having an automatic sheet feeder and being configured to cut sheets to a portion of their thickness using one or more blades. Slitting apparatus 1300, generally, includes a sheet feeder 1302 and a sheet slitting unit 1330. Sheet feeder 1302 includes a sheet tray 1304, on which sheets to be slit are stacked. A left hand lay 1306 and a right hand lay 1308 may be adjusted, to fit sheets of different sizes. A suction-based feed gate 1310 regulates the pulling of sheets from sheet tray 1304 one by one.

Sheet feeder 1302 further includes a registration drive 1312, configured to accurately align and advance the sheets pulled by feed gate 1310 towards sheet slitting unit 1330. Accuracy is important when slitting pre-printed sheets in which the desired location of a detachment line is pre-determined.

Reference is now made to FIG. 14, which shows a schematic side-view illustration of sheet slitting unit 1330 of FIG. 13. An engagement lever, moveable between an engaged position 1402*a* and a disengaged position 1402*b*, is used to adjust slitting depth, for example when using sheets of different materials, different thicknesses and/or the like. When the lever is in its disengaged position 1402*b*, a blade 1410 of a blade assembly 1408, which is mounted on a top portion 1404 of sheet slitting unit 1330, hovers above the sheet passage pattern and does not contact any sheets passing through. Moving the lever towards its engaged position 1402*a* brings closer top portion 1404 and bottom portion 1404 of sheet slitting unit 1330. In turn, blade 1410 is lowered towards the sheet passage pattern. By adjusting the level of the lever between its engaged 1402*a* and disengaged 1402*b* positions, the depth of slitting of the sheets may be properly set.

FIG. 15 shows a schematic side-view illustration of blade assembly 1408 of FIG. 14 Blade assembly 1408 is shown here with the same orientation it is mounted on top portion 1404 of sheet slitting unit 1330, namely—with its blade facing down. Blade assembly 1408 includes a base 1502, a base extender 1504 affixed to or integrally formed with the base, and a blade arm 1506—all made of rigid metal, in this example. Blade arm 1506 is connected to base extender 1504 using a hinge 1514, allowing the blade arm to pivot in relation to the base extender.

A blade 1508 is connected, using a screw 1510, to a curved end 1512 of blade arm 1506. Blade 1508 has at least its portion protruding beyond curved end 1512 being sharp enough to slit a sheet.

An adjustment screw 1516 is threaded through a hole in blade arm 1506, such that the screw's bottom end engages base extender 1504. Threading adjustment screw 1516 inwards brings opposite portions of blade arm 1506 and base extender 1504 apart, and, in turn, retracts blade 1508 so that it penetrates less deeply into the sheet. The opposite applies to threading adjustment screw 1516 in the opposite direction. A spring 1520 is disposed between a bottom surface of base extender 1504 and an extension 1518 of blade arm 1506, to provide opposite force to that of adjustment screw 1516.

FIG. 16, to which reference is now made, shows a perspective view of a portion of sheet slitting unit 1330 of FIG. 13. Blade assembly 1408 is shown mounted on top portion 1404 of sheet slitting unit 1330, such that blade 1508 is positioned close to the sheet passage pattern (shown in FIG. 14). When a sheet advances from registration drive 1312 into sheet slitting unit 1330, it gets slit by blade 1508 and/or by adjacent blade (s) (not shown in this view).

FIG. 17 shows an exemplary sheet 1700 demonstrating two straight slitting lines 1702 and 1704. Exemplary sheet 1700 includes eight pre-printed business cards. After forming slitting lines 1702 and 1704 (and two corresponding slitting lines on the other side of sheet 1700) according to present embodiments, sheet 1700 may be cut, optionally together with a pile of similarly-printed and processed sheets (not shown), along cutting lines 1706, 1708, 1710 and 1712, to separate the eight individual cards. As a result of slitting lines 1702 and 1704, the cards may be bound in notebooks, such as a business card notebook 1800 shown in FIG. 18. The cards bound in notebook 1800, may be detached from the notebook by way of tearing them along slitting line 1802. Those of skill in the art will recognize that sheet 1700 (FIG. 17) and business card notebook 1800 (FIG. 18) are given here merely as examples. According to present embodiments, a sheet may be slit along a different number of slitting lines (or even a single line), and printed material may be arranged on the sheet differently, not necessarily in the same row and column arrangement shown in FIG. 17.

Reference is now made to FIG. 19, which shows a flow chart of a method 1900 for processing a sheet to render the sheet detachable, in accordance with an embodiment. Process 1900 is optionally carried out using slitting apparatus 1300 (FIG. 13) or a similarly-operable apparatus.

In a block 1902, multiple sheets are stacked (also "piled") in an automatic feeder which associated with or is part of an apparatus for slitting sheets. In a block 1904, the slitting depth of the apparatus is set, by adjusting the level of one or more blades relative to the path through which sheets pass.

In a block 1906, the sheets are automatically fed, consecutively (in a single file), by the automatic feeder to a sheet slitting unit. In the feeding, optionally, the sheets may be automatically fine-aligned, for example using a registration drive, as discussed above. The fine alignment is optionally at sub-millimeter accuracy.

In a block 1908, the sheets reaching the sheet slitting unit are slit using one or more blades. Optionally, the blades are essentially stationary and affixed to the sheet slitting unit, and the sheets get slit as they travel through the sheet slitting unit.

In a block 1910, the sheets are flipped over to their opposite side and stacked again 1902 in the feeder. The sheets are then automatically fed 1906 and slits are formed 1908 on their opposite side. Optionally, the alignment of the sheets in the feeder and/or in the registration drive is adjusted, for example to produce two parallel slitting lines (as in FIG. 7*a* or 9*a*), and/or to compensate for asymmetry of the location of the intended slitting lines relative to the sheet; this may be seem, for example, in the illustration of FIG. 17, where the two slitting lines 1702 and 1704 are not centered on the sheet, and hence, when the sheet is flipped over, the sheet has to be re-aligned in order for the slitting lines on the opposite side to be approximately opposite to the previous slitting lines.

In some embodiments, however, it is possible not to perform any re-alignment at all; since a small misalignment, normally in the sub-millimeter level, is inherent to many automatic feeders, slits on opposite sides of the sheet may happen to be parallel even if no manual re-alignment is done. Of course, this applies to scenarios in which the location of the intended slitting lines relative to the sheet is symmetrical. If the location is asymmetrical, then re-alignment may need to be carried out anyway.

As an alternative (or in addition) to re-aligning the sheets, it should be noted that it is equally possible to re-align the blades.

After the sheets have been slit on both sides, they may optionally be post-processed, in a block 1912. Post-processing may include, for example, cutting the sheets to size (such as separating each sheet to its individual units of printed matter and/or removing margins), binding the sheets in notebooks, and/or the like.

A System for Distributing Detachable Business Cards

FIG. 12 schematically illustrates a system for distributing a notepad of business cards, according to one embodiment of the invention.

A user designs a business card using computer 100. This can be carried out by a program thereof, by a web site, and so forth. The design is sent via the Internet 102 to a server 104 of the press firm. The press firm produces notepads of business cards which are detachable according to the present invention, using machinery 106. The printed and detachable business cards are sent to the user via delivery means 108, such as mail, messenger, etc.

Business cards are only one example, and many other detachable press products may be distributed this way, such as landscape postcards, greeting postcards, and so forth.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A sheet having two opposing sides and a prominent fiber orientation, comprising:

a first section on one side of the sheet; and a second section on another the other side of the sheet and substantially parallel to the first section, wherein the sections are not transverse to the prominent fiber orientation of the sheet, and wherein the sections are dimensioned and arranged so that respective separation lines and separation regions formed on the respective sides of the sheet when the sheet is torn result in a homogeneous outlook where respective separation regions are hidden from view, and wherein the sheet is non-coated; and wherein said sheet is banded in a notepad.

2. The sheet according to claim 1, wherein said first section and said second section are rendered along the entire length of said sheet.

3. The sheet according to claim 1, wherein said sheet is selected from a group comprising: a business card, a postcard, a greeting card, a landscape card.

4. The sheet according to claim 1, wherein the sections are substantially parallel to each other.

5. The sheet according to claim 1, wherein the sections share a plane.

6. The sheet according to claim 1, wherein the sections are perpendicular to the sheet.

* * * * *

UNITED STATES PATENT AND TRADEMARK OFFICE

CERTIFICATE OF CORRECTION

PATENT NO. : 8,460,773 B2
APPLICATION NO. : 13/541041
DATED : June 11, 2013
INVENTOR(S) : David Gluck It is certified that error appears in the above-identified patent and that said Letters Patent is hereby corrected as shown below:

In the Claims

Claim 1

Column 10, line 49, delete "another".

Signed and Sealed this
Twenty-ninth Day of July, 2014

*Michelle K. Lee*

Michelle K. Lee
*Deputy Director of the United States Patent and Trademark Office*